US007896140B2

United States Patent
Heitmeyer

(10) Patent No.: US 7,896,140 B2
(45) Date of Patent: Mar. 1, 2011

(54) HANDBRAKE LINKAGE FOR A RAILROAD FREIGHT CAR

(75) Inventor: Kris Heitmeyer, West Linn, OR (US)

(73) Assignee: Gunderson, LLC, Portland, OR (US)

( * ) Notice: Subject to any disclaimer, the term of this patent is extended or adjusted under 35 U.S.C. 154(b) by 990 days.

(21) Appl. No.: 11/710,073

(22) Filed: Feb. 23, 2007

(65) Prior Publication Data

US 2008/0202868 A1   Aug. 28, 2008

(51) Int. Cl.
    B61H 13/02   (2006.01)
(52) U.S. Cl. .......................................... 188/52; 188/54
(58) Field of Classification Search .................... 188/52, 188/54; 59/86

See application file for complete search history.

(56) References Cited

U.S. PATENT DOCUMENTS

| | | | |
|---|---|---|---|
| 1,784,966 A | 12/1930 | Johnson | |
| 2,600,174 A | 6/1952 | Sheehan | |
| 3,850,141 A | 11/1974 | Schmitt | |
| 3,962,811 A * | 6/1976 | Buschini et al. | 43/8 |
| 4,015,697 A | 4/1977 | Cale | |
| 4,077,234 A | 3/1978 | Crochet, Sr. | |
| 4,194,599 A | 3/1980 | Cale | |
| 4,414,726 A | 11/1983 | Cale, Jr. | |
| 4,444,350 A | 4/1984 | Crummett | |
| 4,489,814 A | 12/1984 | Pearson | |
| 4,531,665 A | 7/1985 | Cale, Jr. | |
| 4,553,642 A | 11/1985 | Yates | |
| 4,573,555 A | 3/1986 | Malachowski et al. | |
| 5,000,298 A | 3/1991 | Jackson et al. | |
| 5,038,605 A | 8/1991 | Tews et al. | |
| 5,361,876 A | 11/1994 | Haverick et al. | |
| 5,495,921 A * | 3/1996 | Samulak et al. | 188/202 |
| 6,397,979 B1 * | 6/2002 | Samulak et al. | 188/52 |
| 6,698,552 B2 | 3/2004 | Huber, Jr. et al. | |
| 2008/0202869 A1 | 8/2008 | Heitmeyer | |

FOREIGN PATENT DOCUMENTS

EP   1 535 817 A1   6/2005

OTHER PUBLICATIONS

Landscape Structures Inc., Stainless Steel Double Clevis Set, Jan. 2000, web site advertisement of and photograph of a double clevis.

(Continued)

*Primary Examiner*—Bradley T King
(74) *Attorney, Agent, or Firm*—Chernoff, Vilhauer, McClung & Stenzel, LLP

(57) ABSTRACT

A linkage interconnecting a brake rod with a brake lever in a brake system of a railroad freight car. A length of chain extends from an end of the brake rod, and a monolithic connecting link interconnects an opposite end of the length of chain with a brake lever, so that the brake lever can be moved by pulling the rod, and yet the brake lever is free to move toward the rod if the handbrake system is not in use to keep the brakes applied.

10 Claims, 3 Drawing Sheets

OTHER PUBLICATIONS

Consolidated Rigging & Marine Supply, Crosby-Laughlin CL Forged Swivel, Double Clevis Link, date no later than Jan. 15, 2007, single page of web site advertisement.

File History for U.S. Appl. No. 12/072,025, filed Feb. 21, 2008, Downloaded from U.S. Patent and Trademark Office database Nov. 5, 2010.

Office Action of Oct. 13, 2010, including PTO 892 listing applied references for U.S. Appl. No. 12/072,025, filed Feb. 21, 2008, received Oct. 15, 2010, from U.S. Patent and Trademark Office.

Rejected Claims of U.S. Appl. No. 12/072,025, filed Feb. 21, 2008, U.S. Patent and Trademark Office.

* cited by examiner

HANDBRAKE LINKAGE FOR A RAILROAD FREIGHT CAR

BACKGROUND OF THE INVENTION

The present disclosure relates to brake systems for railroad freight cars, and in particular relates to a handbrake operating linkage for manually moving a brake lever that may usually be moved by a motor such as a pneumatic cylinder-and-piston assembly of an air brake system during train operation.

Brakes on a railroad freight car in a train are normally operated by an air brake system including one or more pneumatic cylinder-and-piston assemblies pushing on brake levers in linkages that force brake shoes against the wheels of the freight car. Manually operated, or handbrake, linkages are also provided in such brake systems so that the brakes can be applied when the air brake system is inoperative, such as when a car is not coupled into a train. Such handbrake linkages include brake rods arranged to be pulled by chains and connected through other chains to pull on the same brake levers, to apply the brakes by hand. A handbrake operating linkage, however, must be arranged so as not to hamper or hinder operation of the air brake system to move the brake lever to apply or release the brakes when the brakes are not being kept applied by the handbrake linkage.

In the past, various linkages have been used to interconnect a handbrake rod with a brake lever, but such previously used linkages have included undesirably expensive parts, or have required more than desired amounts of skilled labor for their assembly, or both. For example, some such linkages have required a pair of devises to connect the ends of a special chain including a pair of long links and several ordinary links between the long links, and both the devises and the special chains have been undesirably expensive to manufacture.

In other handbrake linkages, such a special length of chain has been replaced by ordinary chain and one clevis has been eliminated, but a special joiner link used to connect the chain to the remaining clevis is both undesirably costly to manufacture and requires an undesirably expensive amount of labor for its assembly.

What is desired, then, is a handbrake operating system including an easily assembled and relatively inexpensive linkage for connecting a brake rod to a brake lever.

SUMMARY OF THE DISCLOSURE

A handbrake linkage according to the present disclosure and defined by the claims which form a part of this disclosure provides an answer to the aforementioned desire for a less costly railroad freight car handbrake linkage than has previously been available.

In one embodiment of the linkage disclosed herein a length of chain has uniform links of which an end link is connected to a handbrake rod, and a monolithic connecting link is pinned to an opposite end link of the length of chain, as well as to a brake lever.

As one feature, the linkage disclosed may comprise a monolithic connecting link which has a pair of parallel legs that define a slot in which to receive a brake lever, and a pin may be placed through a pair of coaxial holes defined in the parallel legs and through a hole in the brake lever to connect the monolithic connecting link operatively to the brake lever.

As an aspect of one embodiment of the monolithic connecting link disclosed herein a pair of parallel arms may be spaced apart from each other by an arm spacing large enough to accept a link of the length of chain, and the arms may define coaxial holes to receive a connecting pin extending through the coaxial holes and through the link, to attach the monolithic connecting link to the length of chain.

In one embodiment of the monolithic connecting link, the arms may have outer ends shaped to permit an end link of the chain to pivot about the connecting link without interference between the ends of the arms and the second link of the chain, so that the monolithic connecting link does not significantly reduce the flexibility of the chain.

The portion of a handbrake linkage disclosed herein may be assembled conveniently by attaching one end of a short length of chain to an end of the brake rod, pinning the other end of the chain between the arms of the monolithic connecting link, and pinning the monolithic connecting link to the brake lever with the brake lever between the legs of the monolithic connecting link.

The foregoing and other features of the subject matter of the present disclosure will be more readily understood upon consideration of the following detailed description, taken in conjunction with the accompanying drawings.

DETAILED DESCRIPTION

Figure 1:
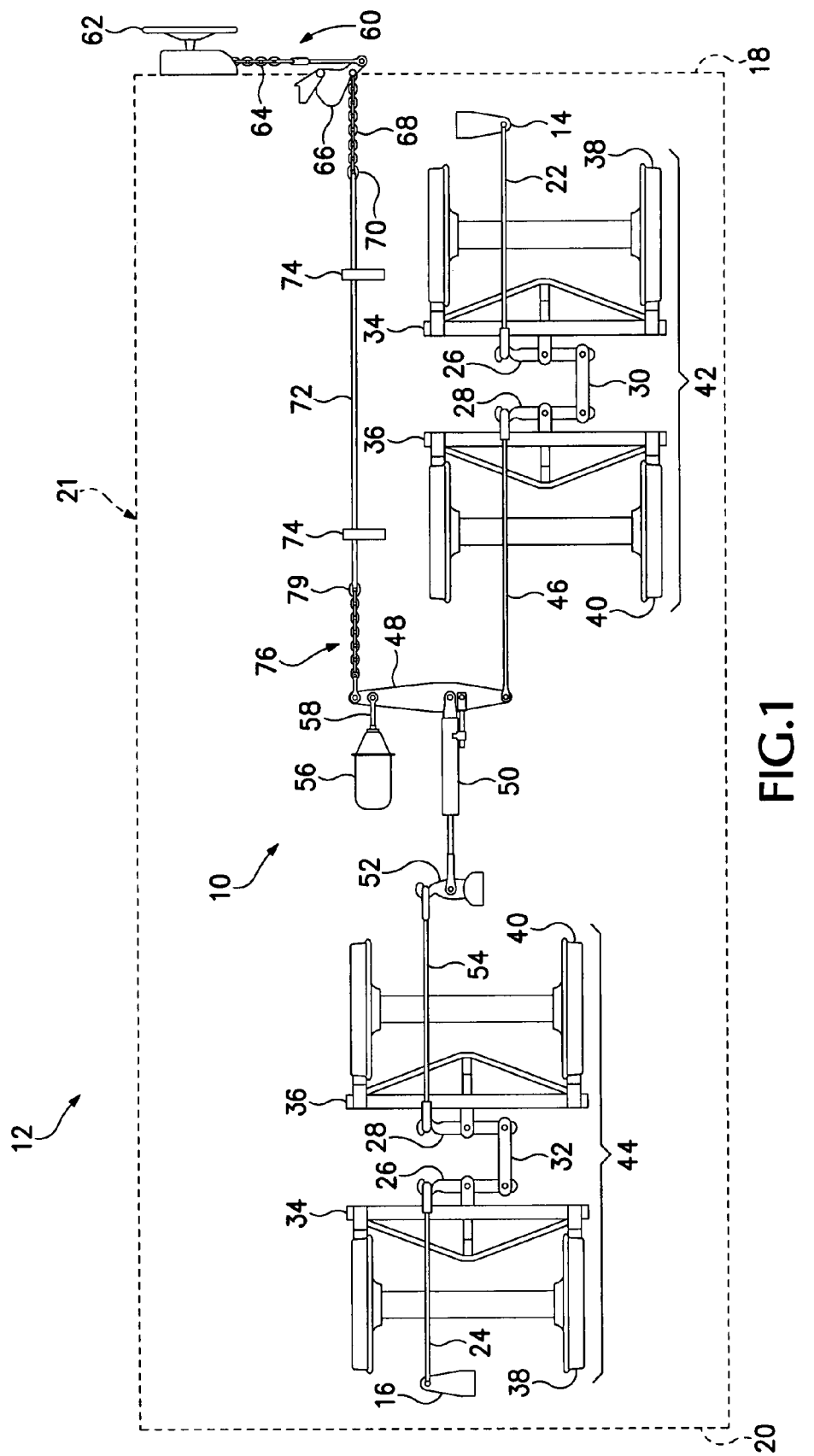
FIG. 1 is a simplified schematic view of a brake system for a railroad freight car.

Referring now to the drawings which form a part of the disclosure herein, a brake system 10 for a railroad freight car 12 as shown in FIG. 1 includes dead lever anchors 14, 16, located at opposite ends 18, 20 of the car body 21, dead lever rods 22, 24, truck levers 26, 28, truck lever connection bars 30, 32, and brake beams 34, 36, which carry brake shoes arranged to be pressed against the wheels 38, 40 of the trucks 42, 44 that support the car body.

A cylinder lever rod 46 extends from the truck lever 28 of the truck 42 near the end 18 of the car body to a cylinder lever 48, and a slack adjuster assembly 50 extends from the cylinder lever 48 to a force multiplier lever 52 mounted on the car body 21. A truck lever rod 54 extends from the force multiplier lever 52 to the truck lever 28 of the truck assembly 44 at the other end 20 of the car 12. An air brake cylinder-and-piston assembly 56 is mounted on the car body 21 and has a piston rod 58 connected to the cylinder lever 48. Application of air brake system pressure within the cylinder and piston assembly 56 causes the piston rod 58 to push the cylinder lever 48, putting the dead lever rods 22, 24, the truck lever rod 54, the cylinder lever rod 46, and the slack adjuster assembly 50 in tension, thus urging the brake shoes on the brake beams 34, 36 toward the wheels 38, 40 of each of the trucks 42, 44, in other words, applying the brakes of the freight car 12.

In order to apply the brakes to the wheels manually when the air brake system is not activated, as when the freight car 12 including such a brake system 10 is not connected with the air line of a train, a handbrake system 60 is provided to actuate the brakes by moving the cylinder lever 48 in the required direction. A handwheel 62 is arranged to pull on a handwheel chain 64, which, in the brake system 10, is connected with a force-multiplying bell crank 66, mounted on the car body 21. The bell crank 66 redirects the tension in the handwheel chain 64, so that tension in the handwheel chain 64 can cause tension of a greater magnitude in the generally horizontally extending chain 68 located beneath the car body 21. It will be understood that various other handwheel chain arrangements including various lever, bell crank, or pulley arrangements could be used instead in a handbrake system to provide the required force to pull such a horizontally extending chain 68.

The horizontally-extending chain 68 is fastened to an outboard, or handwheel, end 70 of a handbrake rod 72, which may be supported by appropriate hangers 74. The handbrake rod 72 extends longitudinally of the car body 21 toward the cylinder lever 48, to which it is connected by a linkage portion 76 of the handbrake system 60, as shown in an enlarged view in FIG. 2.

In some railroad freight cars brake systems are arranged to include a respective air brake cylinder-and-piston assembly 56 mounted on each truck, rather than having a single air brake cylinder and piston assembly 56 mounted on the body 21 of the car as shown in FIG. 1. Railroad freight cars with such truck mounted air brakes still must include a handbrake arrangement.

Not only must the handbrake system 60 be capable of urging the brake beams 34, 36 toward the wheels 38, 40 with adequate force to prevent a freight car such as the car 12 from moving unintentionally when it has been separated from a train, but the handbrake system 60 must not interfere with the operation of the air brake system. A flexible connection is therefore required between the handbrake rod 72 and the cylinder lever 48, in order to allow the cylinder lever 48 to be moved by the pneumatic cylinder-and-piston assembly 56 as required for air brake operation.

Depending upon the configuration and brake system arrangement of a particular railroad freight car, there may be other locations on a railroad freight car in which such a flexible connecting linkage between a brake rod and a lever is required. For example, in the brake system 10 illustrated in FIG. 1, the horizontally extending chain 68 interconnecting the bell crank 66 with the handbrake rod 72 should permit the bell crank 66 to move freely toward the outboard end 70 of the handbrake rod 72 when the hand wheel 62 chain is loosened. In other brake systems (not shown), a brake rod other than a handbrake rod may be connected to a lever by a linkage that must be flexible.

Figure 2:
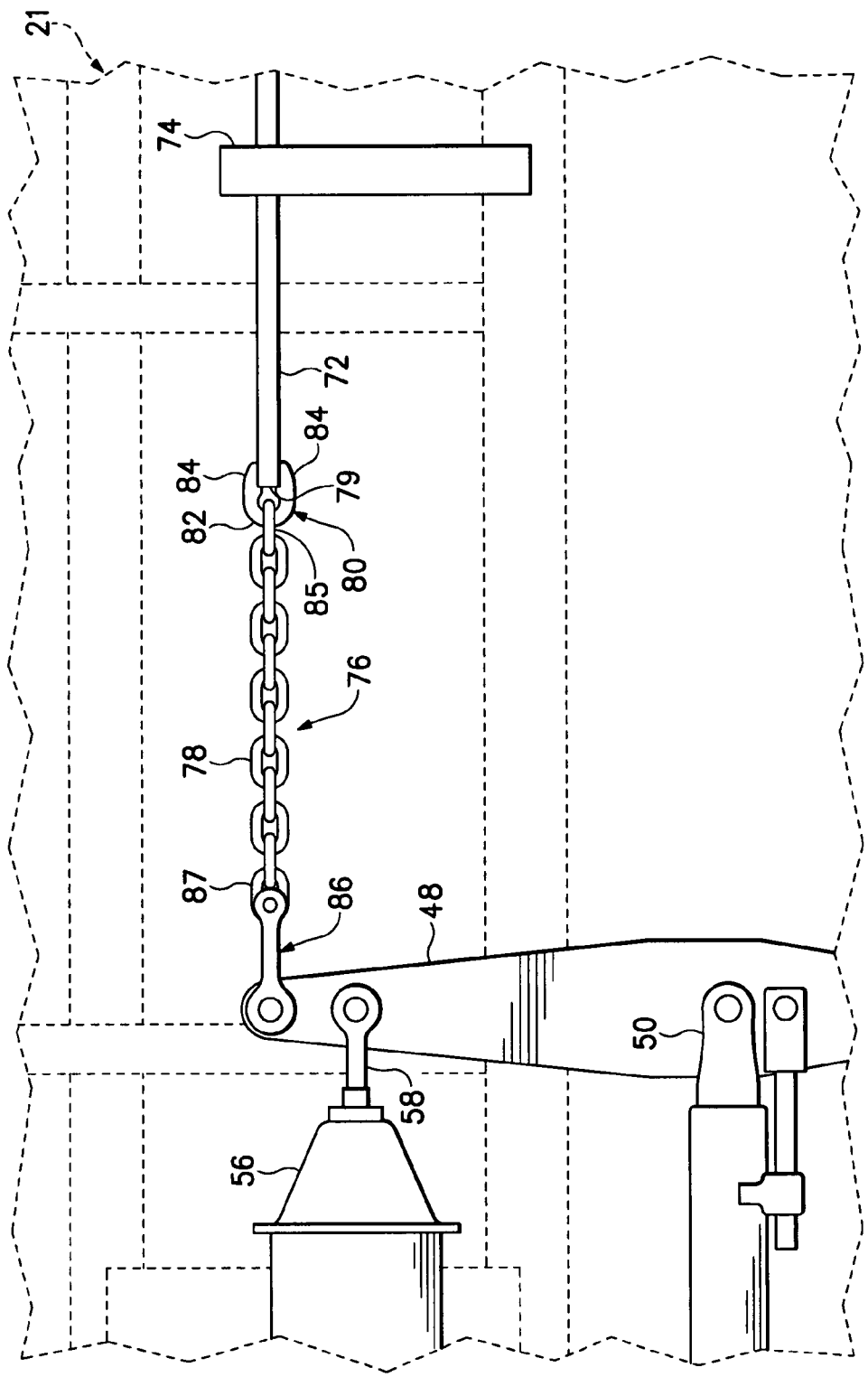
FIG. 2 is a simplified bottom plan view of a portion of a railroad freight car equipped with a brake system such as that shown in FIG. 1, and shows a portion of a handbrake linkage connected with a cylinder lever of such a brake system.

As shown in FIG. 2, the handbrake linkage 60 may include a portion 76 that is significantly less costly to manufacture and install than previously used corresponding linkages. In the portion 76 of the linkage 60 a link located at a first end of a short connecting length of chain 78, for example, a ten-inch length of ½ inch alloy chain, is connected to the pulling, or near, end 79 of the handbrake rod 60 by a single-piece connector 80 that includes a connecting eye and is welded to the pulling, or near, end 79 of the handbrake rod 70. Such a connector 80 may, for example, include a bow portion 82 similar in size to a part of one of the links of the chain 78 and a pair of legs 84 extending from the bow portion 82 and welded to opposite sides of the pulling end 79 of the handbrake rod 72. At least one of the legs 84 of the connector 80 must be small enough to be able to pass through the loop of a link 85 at a first end of the chain 78 during assembly of the linkage 76, to avoid a need for any special preparation of the chain 78, other than cutting it to an appropriate length. If the handbrake rod 72 has already been installed in the freight car 12, it may be necessary to take care that the arms of the connector 80 are located at appropriate positions on the inboard or pulling end 79 of the handbrake rod 72, so as to avoid twisting the chain 78.

The opposite end of the length of chain 78 is connected to the outer end of the cylinder lever 48 by a monolithic connecting link 86 fastened to a link 87 of the chain 78 and to the cylinder lever 48.

Figure 3:
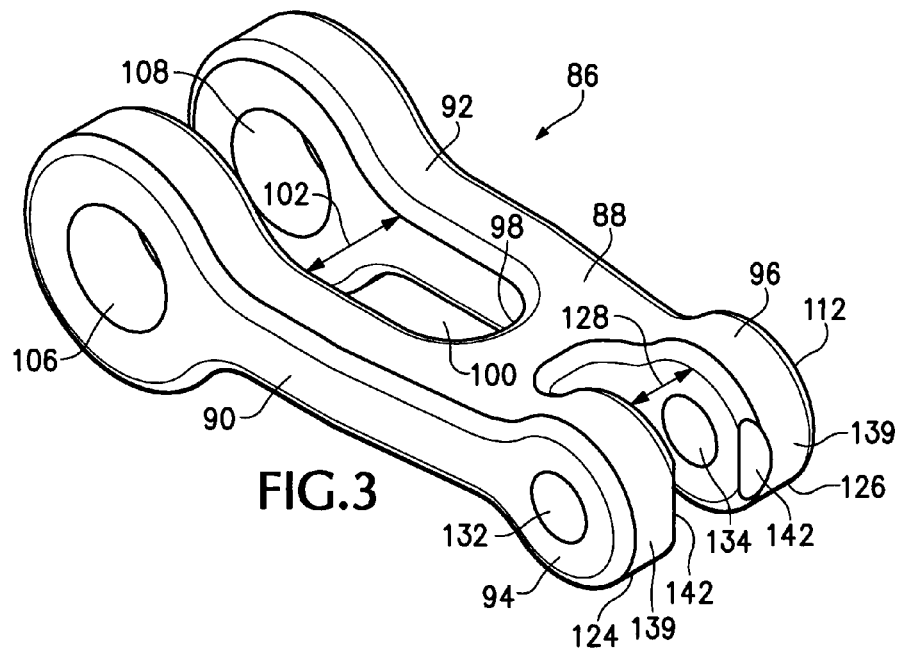
FIG. 3 is an isometric view of a monolithic connecting link which is one element of the handbrake linkage shown in FIG. 2.
Figure 4:
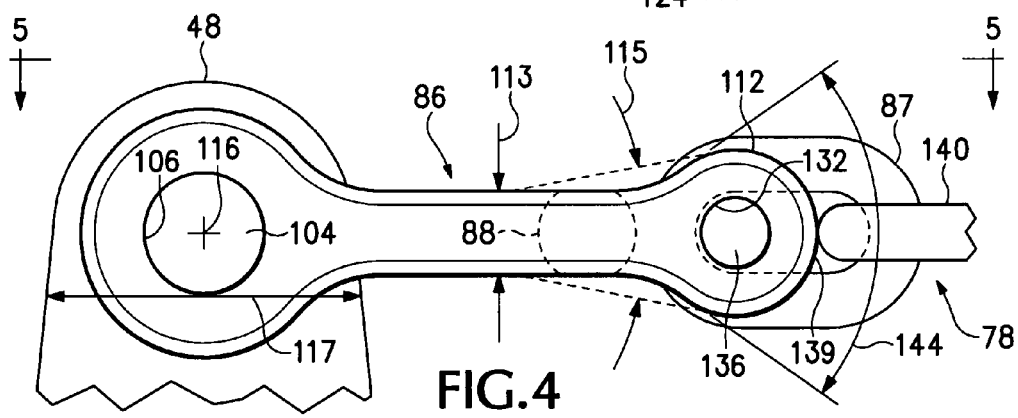
FIG. 4 is a view, at an enlarged scale, of a detail of the portion of a railroad freight car brake system shown in FIG. 2.
Figure 5:
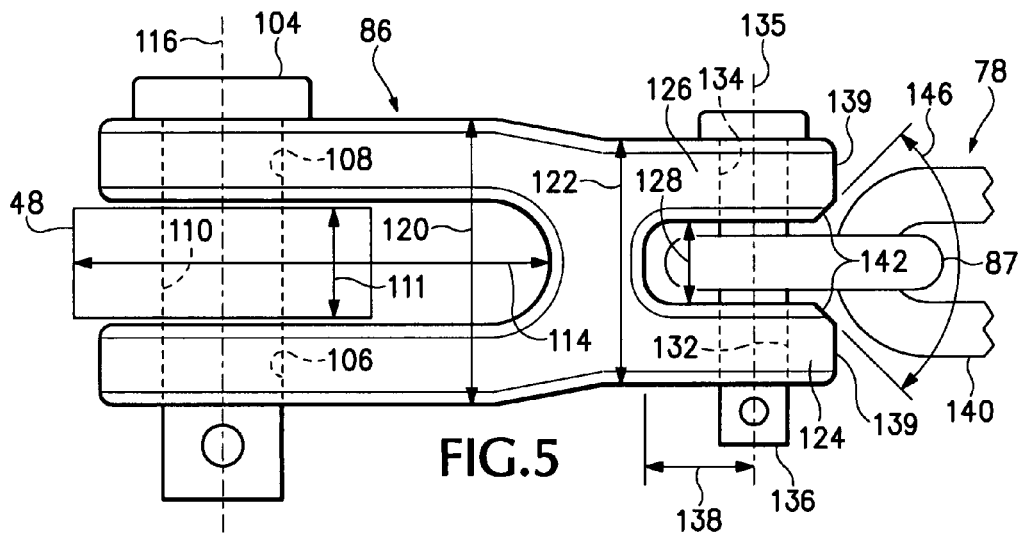
FIG. 5 is a view taken along line 5-5 in FIG. 4.

As may be seen in FIGS. 3, 4, and 5, the monolithic connecting link 86 may have a shape similar to the capital letter "H," and thus has a central body 88 from which a pair of legs 90, 92 and a pair of arms 94, 96 extend in opposite directions. The monolithic connecting link 86 may be forged or cast from steel or another appropriate material, considering the forces to be expected, and considering the cost and the desirability of compact size. The legs 90, 92 may be substantially straight and parallel with each other and may be joined with the body 88 in an arcuately curved inner portion 98 so that a "U"-shaped slot 100 is defined between the legs, and so that the leg spacing, or slot width 102, is appropriate to receive the cylinder lever 48 with an appropriate amount of clearance to allow the connecting link 86 to pivot about a connecting pin 104 extending through a pair of coaxial pin-receiving bores 106, 108 defined respectively in the legs 90, 92, and through a corresponding pin hole 110 extending through the cylinder lever near 48 its outer end, as shown best in FIGS. 4 and 5. For example, for a cylinder lever 48 having a thickness 111 of about 1.0 inch the slot width 102 may be about 1.25 inches.

The body 88 and the portion of each leg 90, 92 near the body 88 may be similar in thickness, and an outer end portion 112 of each leg may be enlarged as an eye defining a respective one of the pin-receiving bores 106, 108 with ample material as seen best in FIGS. 3 and 4.

The legs 90 and 92 are of equal length, and the length 114 to the axis 116 of the bore 106 or 108 in each leg, which may also be considered to be the effective depth of the slot 100, may be about 3 inches in one embodiment of the monolithic link 86, where the width 117 of the cylinder lever 48 is about 2.5 inches adjacent the pin hole 110, so that there is ample clearance to allow the monolithic connecting link 86 to pivot about the axis 116 defined by the connecting pin 104 to accommodate movement of the cylinder lever 48 through its full available range of motion, with the monolithic connecting link 86 directed toward the pulling or near end 79 of the handbrake rod 72. Thus, the depth of the slot in the described embodiment of the monolithic connecting link 86 is at least about twice the slot width 102.

As may be seen best in FIG. 5, the body 88 of the monolithic connecting link 86 may be tapered, from a greatest width 120 adjacent the legs 90, 92 to a somewhat narrower width 122 nearer the opposite end of the monolithic connecting link 86, where a pair of parallel arms 124, 126 extend away from the body in a direction opposite that of the orientation of the legs 90, 92. As shown in broken line in FIG. 4, the body 88 may also be tapered in thickness, from a lesser thickness 113 at a first end near the legs 90, 92, to a greater thickness 115, at a second end near the arms 124, 126. The body 88 is thus strong enough to keep the legs 90, 92 and arms 124, 126 aligned parallel with each other and thus keep the pin-receiving bores 106 and 108, and 132 and 134 aligned with each other.

The arms 124, 126 may extend parallel with each other and may be spaced apart from each other by an arm spacing distance 128 that is less than the leg spacing distance or slot width 102, so long as the distance 128 is sufficient to receive a link 130 of the chain 78 freely between the arms. Each arm 124 and 126 defines a respective one of a pair of coaxial bores 132, 134 having an axis 135, and a pin 136 extends through the coaxial bores and through the loop of the end link 87 of the chain 78. Each arm 124, 126 has a length 138 from the body 88 to the bore axis 135 that is great enough so that there is room for the link 87 to extend between the arms 124, 126 and be held in place by the pin 136. Thus, the length 138 of each arm 124 and 126 to the bore axis 135 is at least as great as the arm spacing distance 128, to provide clearance for the link 87 to swing freely about the pin 136.

The arms 124, 126 have great enough width and the bores 132, 134 are located where there is sufficient material to provide the necessary strength to support the pin 136, but they are also close enough to the outer end 139 of each of the arms to afford clearance for the adjacent, second, link 140 of the chain 78 to remain clear from the outer end 139 of each arm 124, 126. As may be seen in FIGS. 3 and 5, an inwardly facing margin portion of the outer end 138 of each of the arms may be chamfered as at 142 to provide additional clearance for the shoulders of the second link 140 of the length of chain 78. This insures that there is ample clearance between the outer ends 139 of the arms 124, 126 for the end link 87 to pivot through an angle 144 about the connecting pin 136, or for the second link 140 to move through an angle 146 with respect to the end link 87, in either case without the second link 140 being brought into contact against the outer ends 139. The chain 78 thus can move freely with respect to the cylinder lever 48 and the monolithic connecting link 86, to sag when the handbrake has been released and the air brake mechanism is actuated, moving the cylinder lever 48 toward the near, or pulling, end 81 of the handbrake rod 72.

The connecting pins 104 and 136 may, for example, be simple straight pins drilled to receive cotter keys, as shown, or may be other pins such as suitably strong bolts used in combination with locknuts, in order to assure that the disassembly of the linkage 76 when necessary is not unduly difficult, yet the linkage 76 will remain securely connected and available for use when needed.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A portion of a handbrake operating linkage for a railroad freight car, comprising:
    (a) a brake rod having a pulling end;
    (b) a length of chain including a plurality of links;
    (c) a single-piece connector defining a connecting eye engaged with a selected link of the length of chain, the connector being fastened to the pulling end of the brake rod, thereby fastening the length of chain to the pulling end of the brake rod, the connecting eye including a bow engaged within a loop of the selected link with which the connecting eye is engaged, and the connector also including a pair of legs, extending from respective sides of the bow, at least one of the pair of legs of the connector being small enough to pass through the loop of the selected link of the length of chain, and each of the legs of the connector being welded to a respective one of a pair of opposite sides of the pulling end of the brake rod; and
    (d) a monolithic connecting link having a pair of parallel apart-spaced arms connected to an end link of the length of chain by a pin extending between the arms and through an opening defined by the end link of the length of chain, the monolithic connecting link also having a pair of parallel legs extending away from the arms and defining a slot between the legs, each of the parallel legs defining a respective one of a pair of coaxial pin-receiving bores oriented transversely across the slot.

2. The portion of a handbrake operating linkage of claim 1, wherein the parallel legs of the monolithic connecting link are located respectively on opposite sides of a brake lever and the monolithic connecting link is fastened to the brake lever by a connecting pin extending through the pin-receiving bores defined by the legs of the monolithic connecting link and through a corresponding pin hole defined in the brake lever.

3. The portion of a handbrake operating linkage of claim 2, wherein the brake lever is a cylinder lever of an air brake system.

4. The portion of a handbrake operating linkage for a railroad freight car of claim 2 wherein the legs of the monolithic connecting link are significantly longer than the leg spacing between the legs, and wherein the monolithic connecting link is free to move through an angle, about an axis defined by the pin hole in the brake lever, that is great enough that movement of the brake lever does not apply unintended tension on the length of chain and the handbrake rod and the portions of a handbrake operating linkage.

5. The portion of a handbrake operating linkage of claim 1, wherein the pair of apart-spaced arms are spaced apart by an arm spacing distance that is large enough to provide the end link of the chain clearance to pivot freely about the pin extending between the arms and through the opening defined by the end link.

6. The portion of a handbrake operating linkage of claim 5, wherein respective end portions of the apart-spaced arms have inwardly facing margin portions shaped to provide clearance for a link of the length of chain located adjacent to the end link thereof to move about the end portions of the arms as the end link of the chain pivots about the pin extending between the arms.

7. A railroad freight car including a handbrake linkage for moving a brake lever, the handbrake linkage comprising:
    (a) a brake rod having a pulling end;
    (b) a length of chain including a plurality of links;
    (c) a single-piece connector defining a connecting eye engaged with a selected link at a first end of the length of chain, the connector including a bow engaged within a loop of the selected link with which the connecting eye is engaged, and the connector also including a pair of legs, extending from respective sides of the bow, at least one of the pair of legs of the connector being small enough to pass through the loop of the selected link of the length of chain, and each of the legs of the connector being welded to a respective one of a pair of opposite sides of the pulling end of the brake rod, thereby fastening the length of chain to the pulling end of the brake rod; and
    (d) a monolithic connecting link having a first end including a pair of parallel arms embracing and connected to a link at a second end of the length of chain by a first connecting pin extending through the pair of arms, the monolithic connecting link also having a second end connected with the brake lever.

8. The railroad freight car of claim 7 wherein the second end of the monolithic connecting link includes a pair of legs defining a slot and the brake lever extends into the slot and is connected with the monolithic connecting link by a second connecting pin extending through respective coaxial bores defined in the pair of legs and through a corresponding pin hole defined in the brake lever.

9. The railroad freight car of claim 7 wherein the monolithic connecting link is free to pivot about an axis defined by the first connecting pin through an angle with respect to the brake lever while the brake lever moves in response to application of tension to the brake lever through the brake rod and the length of chain.

10. The railroad freight car of claim 7 wherein the parallel arms of the monolithic connecting link fit loosely along opposite sides of the end link at the second end of the length of chain and wherein the arms have outer ends that are shaped so that there is clearance between the outer ends for an adjacent second link of the length of chain to move with respect to the outer ends of the arms and thus to allow the selected link at the first end of the length of chain to swing about the first connecting pin.

* * * * *

UNITED STATES PATENT AND TRADEMARK OFFICE
CERTIFICATE OF CORRECTION

| | | |
|---|---|---|
| PATENT NO. | : 7,896,140 B2 | Page 1 of 1 |
| APPLICATION NO. | : 11/710073 | |
| DATED | : March 1, 2011 | |
| INVENTOR(S) | : Kris Heitmeyer | |

It is certified that error appears in the above-identified patent and that said Letters Patent is hereby corrected as shown below:

Col. 1, line 31, "devises" should read --clevises--.
Col. 1, line 33, "devises" should read --clevises--.

Signed and Sealed this
Ninth Day of August, 2011

David J. Kappos
*Director of the United States Patent and Trademark Office*